Sept. 12, 1967    J. E. BIGELOW    3,341,856
PHOTOEMISSIVE-THERMOPLASTIC INFORMATION RECORDER
Filed Dec. 23, 1963
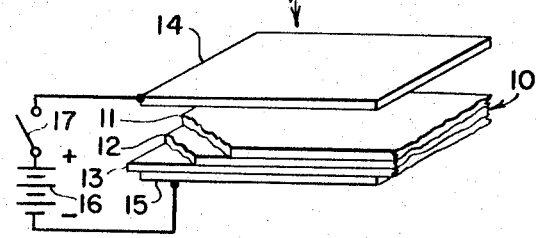
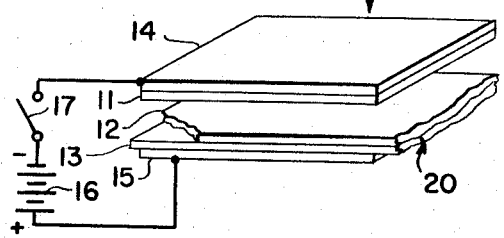
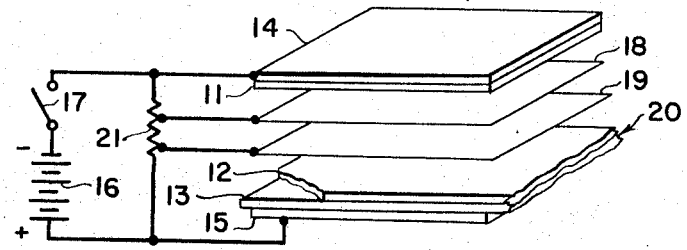
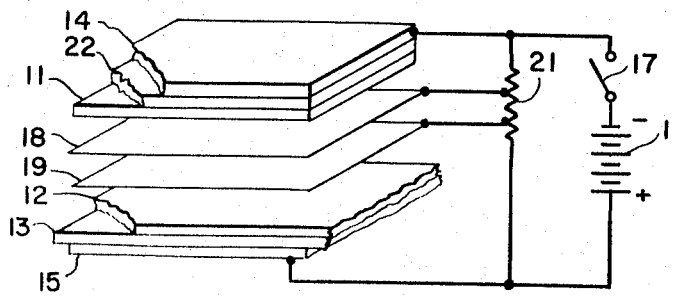
INVENTOR:
JOHN E. BIGELOW
BY
*Robert R Strack*
ATTORNEY United States Patent Office 3,341,856
Patented Sept. 12, 1967

3,341,856
PHOTOEMISSIVE-THERMOPLASTIC
INFORMATION RECORDER
John E. Bigelow, Hales Corners, Wis., assignor to General
Electric Company, a corporation of New York
Filed Dec. 23, 1963, Ser. No. 332,601
10 Claims. (Cl. 346—74)

The present invention relates to a new and improved system for recording on a thermoplastic recording medium. More particularly, the invention relates to an improved recording technique using a photoemissive material to develop a latent electrostatic image on such a thermoplastic recording medium.

Recently, a number of means have been taught for recording information on thermoplastic films. The recording processes essentially include impressing information on a thermoplastic surface in the form of a geometrical distribution of electrical charges. The information is developed by applying heat to the thermoplastic material until the electrostatic forces exerted by the electrical charges are effective to deform it in a modulated pattern commensurate with the original distribution of charges. The material is then cooled to provide a permanent record. The record is conventionally read or interpreted by means of a Schlieren lens system.

One method of depositing the charge distribution upon a thermoplastic surface is by means of an electron beam which is modulated by an input information signal. The beam is scanned across the thermoplastic surface and deposits the charge in the form of lines or gratings, the depth of the gratings being directly related to the amplitude of the applied information. This recording technique is generally carried out in a vacuum as described in the co-pending patent application Ser. No. 8,842, now Patent No. 3,113,179, filed Feb. 15, 1960, by William E. Glenn, and assigned to the assignee of the instant application.

Another technique for establishing a charge pattern on a thermoplastic surface makes use of a photosensitive temporary storage element or photoconductor which is uniformly charged and then exposed to the light image to be recorded. The impinging light image so modifies the electrical characteristics of the photosensitive element that the charge leaks off selectively in accordance with the light characteristics of the image. The charge pattern is then transferred to the thermoplastic surface by applying a polarizing transfer voltage between the photoconductor and the thermoplastic. Such a disclosure appears in the co-pending patent application Ser. No. 862,249, filed Dec. 28, 1959, by Sterling P. Newberry, and assigned to the assignee of the instant invention.

It is an object of the present invention to provide a new and improved means for recording information on a thermoplastic surface without utilizing either an electron beam source or a photoconductive medium.

When an electron beam recording technique is used, the atmosphere in which the recording takes place is critical. In fact, it has been found that a vacuum provides the best results. The recording technique utilizing a photoconductive material eliminates the need for a special atmosphere and permits "in-air" recording. Obviously, the elimination of the special atmosphere limitation is important; however, critical requirements of precharging and mechanical positioning are introduced by this latter type of recording. Thus, it is common to provide means for precharging either the photoconductor or the thermoplastic surface before the actual selective charge deposition step. Furthermore, care must be taken to establish the correct spacing between the photoconductor and the thermoplastic surface in order to permit optimum charge transfer therebetween.

Another object of the present invention is to provide means for recording on a thermoplastic surface that is not restricted to use in special atmospheres and which does not require critical positioning of the thermoplastic surface during development of the charge pattern thereon.

Over twenty years ago, P. Selenyi described a system for recording images on an insulating surface. This system involved the irradiation of a photoemitter with light while supporting it adjacent an insulating surface and applying a voltage therebetween. Electrons, released from the photoemitter by the impinging light, were deposited upon the insulating surface and the latent image created thereby was developed by dusting it with a suitable powder. The final product was relatively primitive, but the technique furnishes a foundation for the present invention.

As described hereinafter, the present invention teaches the use of a photoemitter in conjunction with a process for thermoplastic recording. As well known, a photoemitter is a substance which ejects electrons in response to radiation falling thereon. As used in the present invention, a photoemissive surface is brought in to proximity with a thermoplastic surface and a light pattern is made incident thereon. The electrons emitted are effective to establish a latent electrostatic charge upon the thermoplastic surface which may later be developed in accordance with known techniques.

In a first embodiment, the recording medium employed has a layer of photoemissive material on top of a thermoplastic material. The recording is made by positioning this medium between conductors and irradiating the surface of the photoemitter while applying a voltage between the conductors.

In another embodiment of the invention, the recording medium comprises merely a base material with a thermoplastic film thereon. In this embodiment, the photoemitter is maintained separated from the thermoplastic surface. Recordings are made by irradiating the surface of the photoemitter in the presence of an electric field between the photoemitter and thermoplastic.

Additional embodiments illustrate means for enhancing the charge deposited by the photoemitter in response to radiation. These means include the interposition of a film having high secondary emission characteristics between the photoemitter and the thermoplastic and the incorporation of a fluorescent screen between the source of radiant energy and the photoemitter.

The novel features of the invention are set forth with particularity in the appended claims. The invention itself, however, both as to its organization and method of operation, together with further objects and features thereof, may best be understood by reference to the following description taken in conjunction with the accompanying drawings wherein:

FIGURE 1 schematically illustrates a first embodiment of the invention wherein a recording medium made up of a photoemissive layer, a thermoplastic layer, and a supporting base, is shown;

FIGURE 2 schematically illustrates an embodiment of the invention wherein a photoemissive layer is combined with a transparent conductor and the recording medium comprises a thermoplastic layer on a supporting base;

FIGURE 3 schematically illustrates an embodiment of the invention using a recording medium comprising a thermoplastic layer on a supporting base. In this embodiment, thin electron pervious films are interposed between the photoemissive surface of a transparent conductor and the recording medium;

FIGURE 4 schematically illustrates a further embodiment of the invention using a fluorescent screen to enhance the effect of impinging radiant energy.

In each of the figures, the same numerical designation is used for similar materials. For example, photoemissive material is designated by the numeral 11 in each of the four figures and thermoplastic material is designated by the numeral 12. It should also be noted that the width used in illustrating various layers has not been chosen to represent the actual relative widths of these layers.

In the recording technique illustrated by FIGURE 1, the recording medium 10 is prepared in three layers. The first layer 13 is chosen as a suitable substrate or base material for supporting the subsequent layers. This substrate is commonly fabricated from polymers such as Lexan polycarbonate resin, Mylar, etc. In fact, almost any flat support would be acceptable. A thermoplastic layer 12 is placed upon this substrate and a photoemissive layer 11 is placed above the thermoplastic layer. In this particular embodiment, it is important that the photoemissive material have a sufficiently low work function to emit electrons in response to the radiant energy directed thereupon. In the event that light energy is to be used, metals such as cesium, having a very low work function, are found suitable. However, if this type of metal is used, it is desirable to employ a special atmosphere such as a vacuum or an inert gas in order to protect the material. If the impinging radiation is in the form of ultraviolet or X-rays, then almost any metal has a low enough work function to permit the system to function. Accordingly, in the latter case, in-air recording techniques are possible.

It will be seen that the operative elements in a recording system such as shown in FIGURE 1 comprise the sandwiched recording medium consisting of the photoemitter 11, the thermoplastic layer 12, and the substrate 13. This sandwich is interposed between a transparent conductor 14 and a conductor 15 and an electric field is developed by connecting a direct voltage source 16 across the two conductors. Symbolically, the control over application of source 16 is obtained by a switch 17. Inasmuch as the charge transfer in this process is not by means of corona discharge, the potential of source 16 is below that which would cause an arc discharge between conductor 14 and photoemissive layer 11.

In operation, the information modulated radiant energy is transmitted through conductor 14 to impinge upon photoemitter 11. The electrons emitted from photoemitter 11 in response to this radiation are attracted to conductor 14 leaving a positive charge on photoemitter 11 and the surface of thermoplastic 12 thereby forming a latent electrostatic image pattern conforming to the modulation of the impinging radiation. Because the photoemitter is thin, the charge on it acts equivalent to the charge on the surface of the thermoplastic. In order to develop this latent image into a physical form, the medium 10 is heated to a state of substantial liquidity and subsequently cooled. The means for such development are not illustrated, but they are now well known in the art.

FIGURES 2, 3, and 4 illustrate embodiments of the invention wherein a somewhat different recording medium is employed. Recording medium 20, as used in the remaining figures, consists of a thermoplastic layer 12 on top of a substrate 13. This type of medium is conventionally used in a number of the prior art thermoplastic recording systems. These embodiments differ from that of FIGURE 1 in that the photoemissive layer 11 is never in intimate contact with the thermoplastic layer 12. A number of advantageous features arise from this particular configuration. For one thing, by placing the photoemissive material on the conductor rather than on the thermoplastic, less material is required and a higher performance material may be used. Furthermore, such remote positioning from the thermoplastic layer prevents the possibility of poisoning the photoemitter by the residual solvents and absorbed moisture which are inherent in such a recording medium.

As illustrated in FIGURE 2, the basic recording system when a thermoplastic recording medium 20 is used, includes a transparent conductor 14 with a photoemitter coating 11 on the surface facing the recording medium. Conductor 15 is in contact with recording medium 20 and an electric field is developed between the conductors by means of direct voltage source 16 and switch 17.

In the recording process, switch 17 is closed establishing a negative polarity on conductor 14 and a positive polarity on conductor 15. Irradiation of conductor 14 causes the photoemissive surface 11 to emit electrons with a configuration commensurate to the degree of radiation impinging thereon. The emitted electrons upon leaving the surface of photoemitter 11 are directed to thermoplastic layer 12 by the field created by the potential difference existing therebetween. As long as radiation continues, electrons will be emitted and transferred to the adjacent thermoplastic. Obiously, a scanning technique or a complete exposure technique may be employed. There is no need for erasing latent images from the photoemitter because the photoemissive surface at no time has such an image present thereon. The only latent image developed is that which is created upon the thermoplastic surface 12. As previously noted, in accordance with known techniques, after exposure, the latent image on thermoplastic tape 20 is developed into physical deformations by heating.

FIGURE 3 illustrates an embodiment of the invention offering higher sensitivity. Thin films 18 and 19 are disposed in the gap between photoemitter 11 and thermoplastic layer 12. These thin films are preferably partially pervious to the electrons and exhibit a high secondary emission characteristic. An example of a typical material having such properties is alumina. Appropriate potential values are applied to films 18 and 19 by means of a voltage divider 21 which is directly connected across direct voltage source 16 during the recording operation. The taps on voltage divider 21 are selected to obtain optimum operation; the upper film 18 having a more negative value than the lower film 19.

The embodiment in FIGURE 4 illustrates a technique which is employed to selectively enhance the sensitivity of this recording system for radiation in particular frequency ranges. In order to enhance the sensitivity of the system to X-rays, a fluorescent layer 22 is interposed between the transparent conductor 14 and the photoemitter 11. The advantages of the films 18 and 19 are also utilized in this embodiment. Accordingly, the various layers depicted include, starting at the surface exposed to the information bearing radiant energy: transparent conductor 14, fluorescent layer 22, photoemissive layer 11, thin films 18 and 19, thermoplastic layer 12, substrate 13, and conductor 15. It will be appreciated that the advantages provided by the use of fluorescent layer 22 may also be derived by including it as an element in the recording arrangement shown in FIGURE 1.

In recapitulation, the described recording system teaches means for efficiently recording on a thermoplastic medium. This means is particularly notable in its simplicity, its avoidance of any need for precharging, and its utilization of well known components. The system has been demonstrated by several particular embodiments of the invention. It will, of course, be understood that it is not wished to be limited to these embodiments since modification can be made therein and it is contemplated in the appended claims to cover any such modification as fall within the true spirit and scope of the invention.

What is claimed as new and desired to be secured by Letters Patent of the United States is:

1. A system for recording information on a thermoplastic medium comprising a photoemissive surface in close proximity to said thermoplastic recording medium, means for generating an electric field and disposing said photoemissive surface and thermoplastic recording medium therein, and means for irradiating said photoemissive surface with light modulated in accordance with the information to be recorded.

2. A system for recording information on a thermoplastic recording medium comprising: means for supporting in parallel and successive planes, a first conductor, a photoemissive layer, a thermoplastic layer, and a second conductor; means for applying a direct voltage between said conductors; and means for irradiating said photoemissive layer with radiant energy having a pattern in conformity with the information to be recorded.

3. A recording system as defined in claim 2 wherein said photoemissive layer is separated from said thermoplastic layer.

4. A system for recording information on a thermoplastic recording medium comprising: means for supporting in parallel and successive planes, a first conductor, a fluorescent layer, a photoemissive layer, a thermoplastic layer, and a second conductor; means for applying a voltage between said first and second conductors; and means for irradiating said fluorescent layer with radiant energy having a pattern in conformity with the information to be recorded.

5. A recording system as defined in claim 4 wherein said photoemissive layer is separated from said thermoplastic layer and the magnitude of said voltage is below the electrical breakdown potential of the gap therebetween.

6. A system for recording information on a thermoplastic recording medium comprising, a thermoplastic material, a photoemissive material, means for supporting said photoemissive material in a position parallel to and spaced from said thermoplastic material, means for developing a positive potential gradient from said photoemissive material to said thermoplastic material, the potential difference between said materials being below the electrical breakdown potential of the gap therebetween, means interposed between said photoemissive material and said thermoplastic material exhibiting the characteristic of high secondary emission and being partially pervious to electrons, and means for irradiating said photoemissive layer with radiant energy having a pattern in conformity with the information to be recorded.

7. A system for recording information on a thermoplastic recording medium comprising, a thermoplastic material, a photoemissive material, a fluorescent material, means supporting said fluorescent material in proximity to said photoemissive material, means for supporting said photoemissive material in a position parallel to and spaced from said thermoplastic material, means for developing a positive potential gradient from said photoemissive material to said thermoplastic material, the potential difference between said materials being below the electrical breakdown potential of the gap therebetween, and means for irradiating said fluorescent material with radiant energy having a pattern in conformity with the information to be recorded.

8. A system for recording information on a thermoplastic recording medium comprising, a thermoplastic material, a photoemissive material, a fluorescent material, means supporting said fluorescent material in proximity to said photoemissive material, means for supporting said photoemissive material in a position parallel to and spaced from said thermoplastic material, means for developing a positive potential gradient from said photoemissive material to said thermoplastic material, the potential difference between said materials being below the electrical breakdown potential of the gap therebetween, means interposed between said photoemissive material and said thermoplastic material exhibiting the characteristic of high secondary emission and being partially pervious to electrons, and means for irradiating said fluorescent material with radiant energy having a pattern in conformity with the information to be recorded.

9. A system for recording information on a thermoplastic recording medium comprising, a thermoplastic material, a photoemissive material, means for supporting said photoemissive material in a position parallel to and spaced from said thermoplastic material, means for developing a positive potential gradient from said photoemissive material to said thermoplastic material, the potential difference between said materials being below the electrical breakdown potential of the gap therebetween, means interposed between said photoemissive material and said thermoplastic means exhibiting the characteristic of high secondary emission and being partially pervious to electrons, and means for maintaining said last mentioned means at a potential intermediate that appearing on said photoemissive material and said thermoplastic material.

10. A system for recording information on a thermoplastic recording medium comprising, a transparent conductor having a photoemissive coating on one surface thereof, means for supporting said coated surface in proximity to said thermoplastic recording medium, a film of material positioned between said coated surface and said recording medium and exhibiting the characteristics of high secondary emission and partial electron perviousness, means for establishing a positive potential gradient from said coated surface to said recording medium and for maintaining said film at a potential intermediate that appearing at said coated surface and said recording medium, and means for irradiating said coated surface through said transparent conductor with radiant energy having a pattern in conformity with the information to be recorded.

References Cited
UNITED STATES PATENTS

| | | | |
|---|---|---|---|
| 2,883,543 | 4/1959 | Wohl | 346—74 |
| 3,005,006 | 9/1962 | Dreyfoos | 346—74 |
| 3,113,179 | 12/1963 | Glenn | 340—173 |
| 3,214,272 | 3/1967 | Ploke | 346—74 |

BERNARD KONICK, *Primary Examiner.*

IRVING SRAGOW, TERRELL FEARS, *Examiners.*

R. G. LITTON, *Assistant Examiner.*